United States Patent [19]
Christopher et al.

[11] Patent Number: 5,448,986
[45] Date of Patent: Sep. 12, 1995

[54] HEAT EXCHANGER

[75] Inventors: Delbert S. Christopher, Jacksonville, Tex.; Dennis R. Maiello, Fort Smith, Ark.

[73] Assignee: Lennox Industries Inc., Dallas, Tex.

[21] Appl. No.: 95,671

[22] Filed: Jul. 21, 1993

[51] Int. Cl.$^6$ ............................................... F24H 3/02
[52] U.S. Cl. ............................. 126/110 R; 126/116 R
[58] Field of Search ............ 126/116 R, 110 R, 116 B

[56] References Cited

U.S. PATENT DOCUMENTS

| | | | |
|---|---|---|---|
| 4,729,207 | 3/1988 | Dempsey et al. | 126/110 R |
| 4,848,314 | 7/1989 | Bentley | 126/116 R |
| 4,860,725 | 8/1989 | Tallman et al. | 126/110 R |
| 5,178,124 | 1/1993 | Lu et al. | 126/110 R |
| 5,309,890 | 5/1994 | Rieke et al. | 126/116 R |
| 5,313,930 | 5/1994 | Kujawa et al. | 126/116 R |

*Primary Examiner*—Carroll B. Dority
*Attorney, Agent, or Firm*—Allegretti & Witcoff, LTD.

[57] ABSTRACT

A heat exchanger comprises a clam shell having a first passage, a second passage and a third passage connected sequentially in a plane. A hot collector box made from metal, for example, aluminized steel, in connected to the third passage. A secondary heat exchanger coil is operatively connected to the hot collector box. A second collector box or cold collector box made from plastic is connected to the outlet of the secondary heat exchanger coil. Condensate from the flue and condensate from the cold collector box may be discharged in a common line from the furnace. The clam shell is constructed and arranged to remove about 90%-95% of the energy from the flue products flowing therethrough. The heat exchanger is disposed in a passage between the inlet and the outlet in the housing of a furnace. Air is forced over the heat exchanger, which is disposed in the passage, by a blower in the housing.

9 Claims, 2 Drawing Sheets

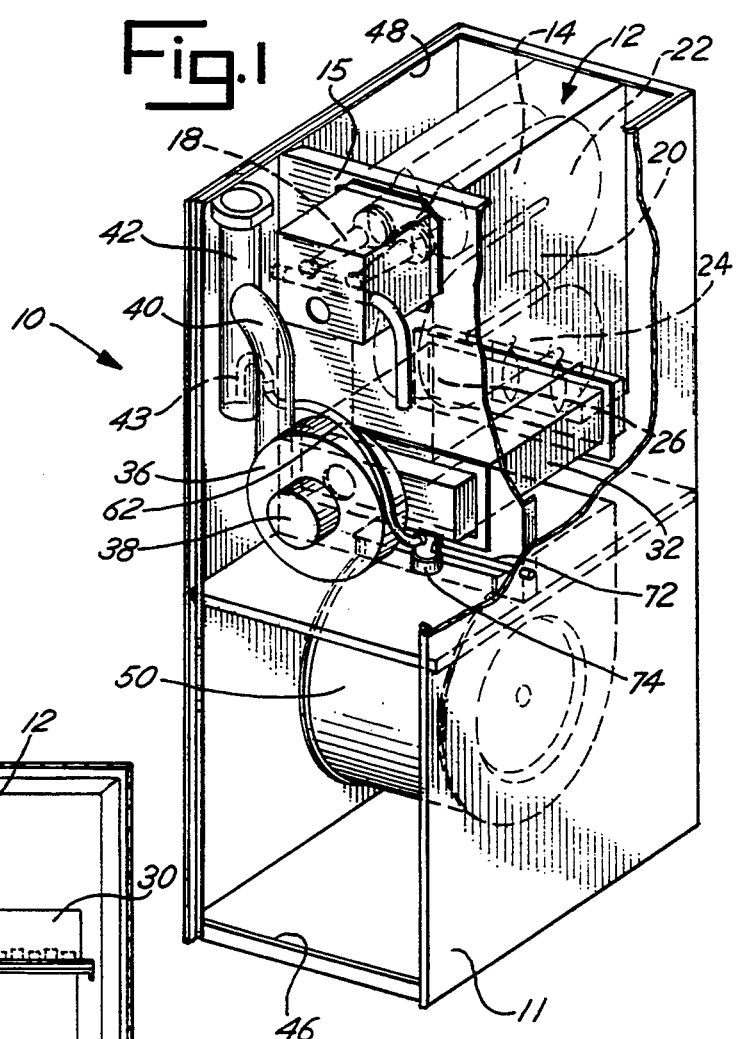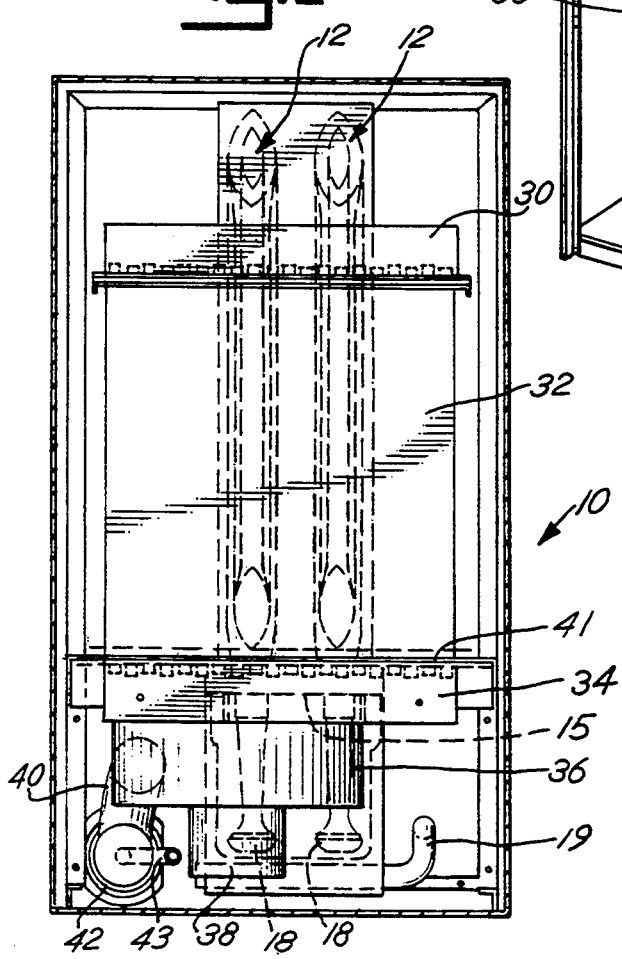

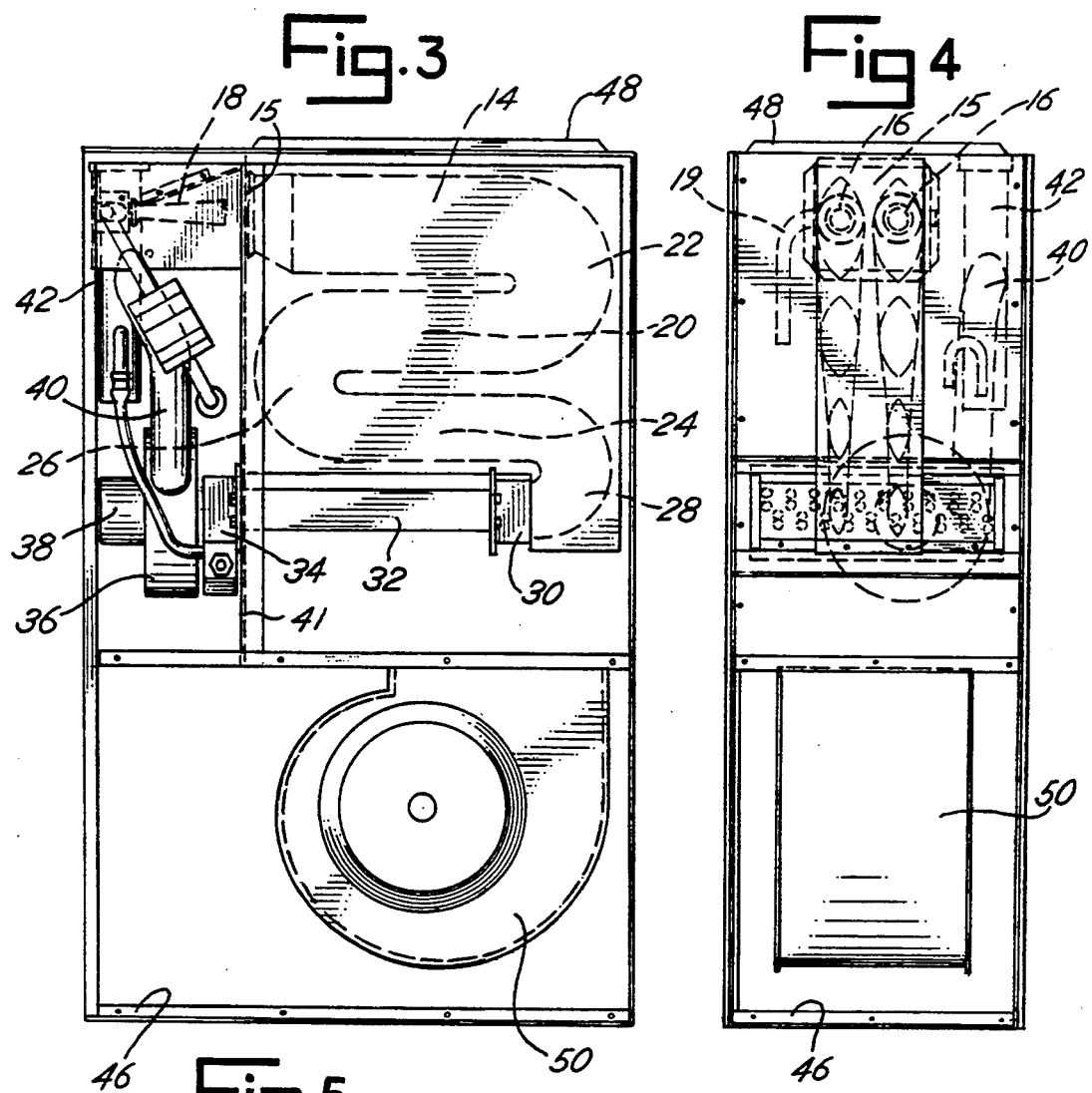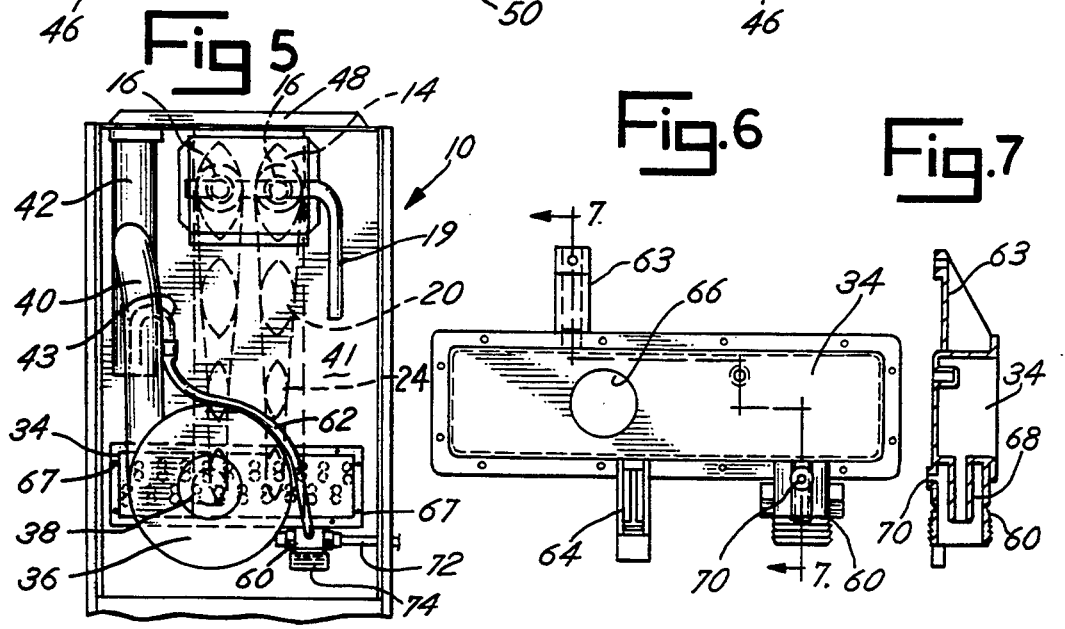

HEAT EXCHANGER

BACKGROUND OF THE INVENTION

The present invention pertains to a heat exchanger and more particularly, to a compact heat exchanger that allows the use of less expensive materials and prevents the possibility of flue products condensing in unwanted places within the heat exchanger.

In the past, high efficiency gas furnaces have required a secondary coil to be placed below or beside the primary heat exchanger coil. This requires either additional height or width for the furnace, as well as adding plumbing cost to the furnace.

An object of the present invention is to provide an improved heat exchanger for a gas fired furnace, wherein the deficiencies and disadvantages of prior gas fired furnace designs are obviated.

Another object of the present invention is to provide a compact three pass high efficiency heat exchanger for a gas fired furnace that includes a secondary heat exchanger and wherein about 90%–95% of the energy is removed from the flue products flowing there-through.

Yet another object of the present invention is to provide an improved compact heat exchanger comprising three substantially parallel passes operatively connected to a hot collector box that is in turn operatively connected to the secondary heat exchanger, said three parallel passes constructed and arranged to remove about 70%–75% of the energy from the flue products flowing therethrough. Upon entering the secondary heat exchanger, the flue products will be 500°±100° F., well above condensing, and all condensing will take place in the stainless steel secondary heat exchanger, allowing the unit to glean a total of 90–95% of the energy input from the fuel. Other objects and advantages of the present invention will become more apparent hereinafter.

BRIEF DESCRIPTION OF THE DRAWING

There is shown in the attached drawing a presently preferred embodiment of the present invention, wherein like numerals refer to like elements in the various views and wherein:

FIG. 1 is a perspective view of a furnace embodying the heat exchanger of the present invention;

FIG. 2 is a plan of the furnace of FIG. 1, with parts broken away;

FIG. 3 is a side view of the furnace;

FIG. 4 is a rear view of the furnace;

FIG. 5 is a front view of the furnace, with parts broken away;

FIG. 6 is a front view of the cold header box; and

FIG. 7 is a cross sectional view of the cold header box taken generally along line 7—7 of FIG. 6.

DETAILED DESCRIPTION OF THE PRESENT INVENTION

There is shown in the drawing a gas fired furnace 10 embodying the novel heat exchanger assembly 12 of the present invention.

There are two heat exchanger assemblies 12 illustrated in the furnace embodiment, disposed in side by side relationship. Other heat exchanger assemblies may be added for larger sizes of furnaces. Each heat exchanger assembly 12 comprises a first passage 14 defining an elongated pass and communicating at one end with a burner 18. The burners 18 are in a burner enclosure having a Corbel 15 for each burner. Gas is supplied to the burners 18 via conduit 19 connected to a suitable gas valve (not shown) that is in turn connected to a source of fuel (gas). The Corbel 15 provide specific size openings 16 therein for communicating the burners 18 to the first passages 14, respectively, of each heat exchanger 12. The first passage 14 is connected to a second passage 20 defining a second elongated pass by a curved section 22. The second passage 20 is operatively connected to a third passage 24 defining a third elongated pass by a curved section 26. The burner 18 is adapted to fire the length of first passage 14 and thus the walls of the first passage are the hottest of all of the passages.

A turbulator may be employed within the tubes of the secondary heat exchanger coil 32, the fourth and final pass of the heat exchanger 12, to enhance the turbulence of the flowing flue products and thereby enhance the heat transfer capabilities of the flue products to the walls of the heat exchanger. A preferred form of turbulator that can be used has two twists per inch.

The three passages 14, 20, and 24 are disposed in generally parallel relationship to one another and as seen in FIGS. 1, 2, 4 and 5 lie substantially in a vertical plane. Each heat exchanger 12 basically is in the form of a clamshell comprised of metal plates formed to define the three passages 14, 20 and 24 and sealed at the ends so as to confine the flue products. The metal plates can be made from aluminized steel.

The outlet from the third passage 24 is operatively connected to a hot collector box 30 by means of curved section 28. A secondary heat exchanger 32 extends from the hot collector box 30 and its outlet is connected to a collector box or cold header box 34. The secondary heat exchanger 32 is preferably a conventional fin and tube heat exchanger having two rows. A greater number of rows can be used for larger units, as desired. The hot collector box 30 is preferably fabricated from metal, for example, aluminized steel, whereas the cold collector box or cold header box 34 is preferably fabricated from plastic such as glass filled Norel, a product of General Electric Company. The primary heat exchanger portion ends in the back of the furnace 10 and thus the secondary heat exchanger 32 is entered from the rear and flue products travel through the tubes thereof from back to front.

Combustion fan 36 driven by motor 38 is operatively connected to the collector box 34 for applying a draft to the collector box 34 to draw flue products from the heat exchangers 12. The flue products or gases are discharged from the combustion fan 36 through housing 40 that communicates with exhaust conduit 42. The exhaust conduit 42 is adapted to be communicated to a vent connection in a conventional fashion to discharge the flue products to the atmosphere.

U-shaped conduit 43 communicates at one end with the interior of exhaust conduit 42 adjacent the bottom thereof where condensate may be collected and at the other end with condensate collection means in the furnace 10. The condensate collection means comprise a tube 62 connected to conduit 43 for conveying the condensate to an outlet connection 70 from the cold header box 34 (FIGS. 5–7).

The cold header box 34 is adapted to be operatively connected to coil 32 at the cold end. The cold header box 34 is connected to panel 41 by suitable screw means 67. The combustion fan 36, which is connected to brackets 63 and 64 (FIG. 6), is adapted to communicate with opening 66 in a wall of the cold collector box 34 (FIG. 6). Condensate may drain from the cold collector box 34 via drain tube 68 and the outlet connection 60. Drain tube 68 is integrally formed with or otherwise secured to the bottom of the cold header box 34 and is oriented within the outlet connection 60 as shown in FIGS. 6 and 7. The outlet connection 60 communicates with a conduit 72 (FIGS. 1 and 5) for carrying condensate from the exhaust conduit 42 and from the cold collector box 34 to a disposal point or drain exterior of the gas furnace 10. The threaded opening 70 for hose connection, barb type (FIGS. 6 and 7) communicates with the tube 62. A side opening of outlet connection 60 communicates with conduit 72. The bottom opening of outlet connection 60 for collector box 34 is capped as shown at 74 in FIGS. 1 and 5 for cleaning purposes.

The casing or housing 11 for the gas furnace 10 has three options for cutting inlet opening 46 adapted to receive air to be treated from a room or like area and an outlet opening 48 for returning treated air to said room or like area. Air is drawn into inlet opening (or openings) 46 by fan 50 and forced over the heat exchanger assemblies 12 and then discharged from the outlet opening 48.

The air drawn into the housing 11 for gas furnace 10 through inlet opening 46 passes first over the lower most or coolest passes of the heat exchangers 12 and then over the third pass, the second pass and the first pass. The heat exchangers 12 function in an efficient fashion as a result of the configuration and disposition of their parts in the air stream passing through the gas furnace 10 (counter flow design). The hot collector box 30 is made from metal, as it contains flue products on the order of 500° F. On the other hand, the flue products passing from the secondary heat exchanger 32 are cooled sufficiently, on the order of 156° F. or less, that the collector box 34 may be made from plastic.

The present invention provides a gas furnace that is compact and that is efficient in operation as a result of the construction and disposition of the novel heat exchanger therein. There has been provided by the present invention a compact gas furnace and reduces plumbing costs significantly as compared to similar high efficiency gas furnaces. Further, the primary heat exchanger of this invention removes about 70%-75% of the energy to be transferred out of the flue products prior to entering the secondary heat exchanger as opposed to known arrangements which take 80% or more of the energy out of the flue products in the primary heat exchanger. This allows the use of less expensive materials, e.g., aluminized steel for the hot collector box, and prevents condensate from forming in unwanted places. In prior gas furnaces of similar construction, flue products entered the secondary heat exchanger at below 500° F. With the present invention, flue products entering the heat exchanger are hotter, on the order of 500°-700° F. Though hotter initially, upon coil entry, the flue products are cooled sufficiently so that they enter the cold header box 34 at a temperature on the order of 156° F., or below (typically 100°-130° F.). The efficiency for a prototype unit 10 was 93% steady state and 90% DOE AFUE.

While we have shown a presently preferred embodiment of the invention, it will be apparent to persons skilled in the art that the invention may be otherwise embodied within the scope of the appended claims.

We claim:

1. A heat exchanger assembly for a fuel-fired furnace, said heat exchanger assembly comprising a primary heat exchanger and a secondary heat exchanger, said primary heat exchanger having a casing with a first passage defining a first pass, a second passage defining a second pass and a third passage defining a third pass, the first, second and third passages being disposed in generally parallel relationship to one another, said heat exchanger assembly further including an elongated first collector box and an elongated second collector box extending substantially transverse of said primary heat exchanger, said primary heat exchanger further including a first curved section operatively connecting said first and second passages, a second curved section operatively connecting the second and third passages and a third curved section operatively connecting the third passage and the first collector box, said secondary heat exchanger having an inlet operatively connected to the first collector box and an outlet operatively connected to the second collector box, said first collector box being intermediate said third curved section and the inlet of said secondary heat exchanger, whereby said heat exchanger assembly is configured for products of combustion to flow sequentially through said first, second and third passages, said first collector box, said secondary heat exchanger and said second collector box.

2. The heat exchanger assembly of claim 1 wherein said casing is a clamshell casing, said first passage having a greater cross-sectional area than said second passage, said second passage having a greater cross-sectional area than said third passage.

3. The heat exchanger assembly of claim 2 further including a burner associated with and firing in the first passage.

4. A fuel-fired furnace comprising a housing having a plurality of walls, one of said walls having an inlet opening and another of said walls having an outlet opening, said housing having passage means communicating between the inlet opening and the outlet opening, said furnace further including fan means for moving air through the housing and a heat exchanger assembly in the passage means, said heat exchanger assembly including a primary heat exchanger and a secondary heat exchanger, said primary heat exchanger having a casing with a first passage defining a first pass, a second passage defining a second pass and a third passage defining a third pass, the first, second and third passages being disposed in generally parallel relationship to one another, said heat exchanger assembly further including an elongated first collector box and an elongated second collector box extending substantially transverse of said primary heat exchanger said primary heat exchanger further including a first curved section operatively connecting said second and third passages and a third curved section operatively connecting said third passage and said first collector box, said secondary heat exchanger having an inlet operatively connected to the first collector box and an outlet operatively connected to the second collector box, said first collector box being intermediate said third curved section and the inlet of said secondary heat exchanger and being spaced from said housing to allow air flow between said housing and said first collector box.

5. The furnace of claim 4 wherein said first collector box is positioned with respect to said fan means such that at least some of the air moved by said fan means passes between said first collector box and said housing without passing through the secondary heat exchanger.

6. The furnace of claim 4 wherein said casing is a clamshell casing, said first passage having a greater cross-sectional area than said second passage, said second passage having a greater cross-sectional area than said third passage, the first, second and third passages being configured to remove about 70%–75% of the energy from products of combustion flowing through the primary heat exchanger.

7. The furnace of claim 4 further including a burner associated with and firing in the first passage.

8. The furnace or claim 4 further including an exhaust vent and a combustion air blower operatively connected between the second collector box and the exhaust vent for communicating products of combustion from the second collector box to the exhaust vent, said furnace including first conduit means for conducting condensate from the exhaust vent and second conduit means for conducting condensate form the second collector box.

9. The furnace of claim 8 wherein said first conduit means includes a conduit communicating between said exhaust vent and second conduit means.

* * * * *